United States Patent [19]
Patrick

[11] Patent Number: 6,105,563
[45] Date of Patent: Aug. 22, 2000

[54] SYSTEM, METHOD, AND DEVICE FOR NITROUS OXIDE INJECTION

[75] Inventor: Matthew R. Patrick, Edina, Minn.

[73] Assignee: Competition Cams, Inc., Memphis, Tenn.

[21] Appl. No.: 09/325,840

[22] Filed: Jun. 4, 1999

Related U.S. Application Data

[63] Continuation of application No. 09/096,342, Jun. 12, 1998, Pat. No. 5,967,099.

[51] Int. Cl.$^7$ .................................................. F02B 23/00
[52] U.S. Cl. ............................................................ 123/585
[58] Field of Search ............................................. 123/585

[56] References Cited

U.S. PATENT DOCUMENTS

| | | | |
|---|---|---|---|
| 4,683,843 | 8/1987 | Norcia et al. ............................ | 123/1 A |
| 5,269,275 | 12/1993 | Dahlgren .................................. | 123/492 |
| 5,287,281 | 2/1994 | Meaney .................................... | 701/105 |
| 5,444,628 | 8/1995 | Meaney et al. ......................... | 364/431.05 |
| 5,853,018 | 12/1998 | DeLand et al. ......................... | 123/518 |

OTHER PUBLICATIONS

Fuel Injection Nitrous Systems, NOS Nitrous Oxide Systems, Inc., May 17, 1998, http://www.nosnitrous.com/page 12.html (Internet Article).

5.0L Ford Mustang Systems, NOS Nitrous Oxide Systems, Inc., May 17, 1998, http://www.nosnitrous.com/page 13.html (Internet Article).

Primary Examiner—Noah P. Kamen
Attorney, Agent, or Firm—Jones Jain, L.L.P.; Wilburn L. Chesser

[57] ABSTRACT

The present invention relates to a nitrous oxide injection device and system, and a method of installation of the device and system, and, in particular, to a self-contained, easy to install nitrous oxide device that provides fuel delivery that varies with nitrous oxide tank pressure by way of a manifold that is pressurized by a bleed orifice from the nitrous oxide source. The pressure from the manifold is transferred by a connection to the fuel pressure regulator of the vehicle, so that fuel delivery varies proportionally to the pressure of the nitrous oxide source.

8 Claims, 6 Drawing Sheets

SYSTEM, METHOD, AND DEVICE FOR NITROUS OXIDE INJECTION

This application is a continuation of applicant's U.S. patent application Ser. No. 09/096,342 of Shelden Gecker, Jr., entitled "SYSTEM, METHOD, AND DEVICE FOR NITROUS OXIDE INJECTION" filed Jun. 12, 1998, which issued as U.S. Pat. No. 5,967,099 on Oct. 19, 1999.

FIELD OF THE INVENTION

The present invention relates to a nitrous oxide injection device and system, and a method of installation of the device and system, and, in particular, to a self-contained, easy to install nitrous oxide injection device that provides self-adjusting fuel delivery that varies with nitrous oxide tank pressure by way of a pressure connection to the vehicle's fuel regulator.

BACKGROUND

Addition of an oxygen enhancer into internal combustion engines provides large amounts of horsepower by allowing an engine to burn more fuel. One widely used oxygen enhancer is nitrous oxide, which is sometimes referred to as "nitrous." Burning more fuel creates more cylinder pressure pushing down on the pistons, which results in more engine power. When the nitrous oxide is injected into an engine cylinder, the initial combustion within the cylinder creates enough heat to separate the nitrous oxide into its two components, nitrogen and oxygen. Once this separation occurs, the oxygen can then be used to burn more fuel. At this point, the combustion side of the equation becomes very important. All of the extra oxygen the nitrous oxide provides must have fuel to burn or severe engine damage will occur. As a result, supplemental fuel (also know as enrichment fuel) must be added when nitrous oxide is injected into the engine. When the amount of nitrous oxide and the amount of supplemental fuel is controlled precisely, large amounts of power can be made with no harm to the engine.

Known nitrous oxide injection systems include systems for electronic or computerized control of nitrous oxide and enrichment fuel feed. This art includes U.S. Pat. No. 5,269,275 to Dahlgren, U.S. Pat. No. 5,287,281 to Meaney, and U.S. Pat. No. 5,444,628 to Meaney, et al. Each of these systems is relatively difficult to install and requires complicated management of or replacement of stock engine fuel components, such as fuel injectors and electronic or computerized fuel control systems. None of these known systems uses an easy to install system that uses unmodified stock engine components and a bolt-on system using nitrous oxide pressure to control fuel feed.

U.S. Pat. No. 4,683,843 to Norcia, et al., describes a protective system for preventing excessive buildup of nitrous oxide in the delivery system using a second valve arrangement. The device of Norcia does not describe an easy to install, bolt-on system that uses varying nitrous oxide pressure to vary fuel feed, nor does it include an accelerator actuated nitrous oxide injection system.

One known system for a relatively easy to install nitrous oxide kit that is designed as a "dry" system (i.e., wherein the nitrous oxide is not combined with the fuel in the fuel system) with fuel enrichment accomplished through an increase in fuel pressure is a system developed by Nitrous Oxide Systems, Inc., of Costa Mesa, Calif. The Nitrous Oxide Systems device utilizes a nitrous oxide pressure regulator that is teed off of the main delivery hose. This regulator provides a pre-set pressure source to the fuel pressure regulator diaphragm, regardless of nitrous bottle pressure. A problem with the Nitrous Oxide Systems device is that it does not provide a varying pressure to the pressure regulator diaphragm with varying nitrous bottle pressure. Thus, the Nitrous Oxide Systems device does not provide a varied fuel pressure to optimize fuel enrichment as the nitrous bottle pressure changes.

Another problem with known systems is that many current nitrous oxide systems use a throttle arm actuated micro-switch in order to activate nitrous oxide feed. This method requires fabrication of a mounting bracket for the switch, as well as placement of the switch for proper operation. The known art does not include a single, nearly universal system of activation of nitrous oxide feed that does not depend on the particular features of the throttle arm of the vehicle in which the system is installed.

Thus, there remains a need for a nitrous oxide injection system, method, and device that is self-contained, easy to install, and self-adjusting for fuel enrichment and nitrous oxide feed.

SUMMARY OF THE INVENTION

The present invention provides an oxygen enhancer, such as nitrous oxide, injection system and device and method of installation that is self-contained and easy to install and that provides variable fuel pressure tailored to varying nitrous oxide tank pressure.

The system, device, and method of the present invention automatically adjusts the amount of additional fuel being added in relation to nitrous bottle pressure so that consistent nitrous to fuel ratios can be maintained, resulting in optimal power at all bottle pressures.

It is an object of the present invention to provide a nitrous oxide injection device that includes three power stages in each device. It is a further object of the present invention to provide three power stages, which result in incremental power increases, by varying the fuel pressure jet.

It is an object of the present invention to provide a pre-assembled wiring harness for easy, plug-in installation.

It is an object of the present invention to contain all major components (solenoid, electronic throttle switch, nitrous manifold) in an attractive enclosure.

It is an object of the present invention to provide solenoid current draw that is many times less than that of the known art. It is thus a further object of the present invention to reduce the likelihood of excessive solenoid current draw problems for the vehicle electrical system, such as burnt wires and blown fuses.

It is an object of the present invention to provide, once armed, a nitrous oxide injection device that is engaged at wide open throttle by an electronic switch that is triggered by the engine's throttle position sensor. It is a further object of the present invention to provide an engine throttle position sensor trigger that is installed using a wire tap that is clipped onto the throttle position sensor output wire.

The present invention relates to a nitrous oxide injection device and system, and a method of installation of the device and system, and, in particular, to a self-contained, easy to install nitrous oxide device that provides fuel delivery that varies with nitrous oxide tank pressure. The present invention accomplishes varied fuel delivery by way of a nitrous manifold that is pressurized by a bleed orifice from the nitrous oxide source; the pressure from the manifold is then transferred by a line (conduit) to the fuel pressure regulator of the vehicle, so that fuel delivery is increased proportional to the pressure of the nitrous oxide source.

The nitrous oxide injection device of an embodiment of the present invention includes a supply cylinder containing pressurized liquid nitrous oxide. This cylinder is connected by means of a delivery hose to a normally closed, solenoid actuated valve. This solenoid actuated valve, which the operator uses to engage and disengage the system, is attached to a nitrous manifold assembly. The manifold assembly distributes the nitrous oxide to the engine's air inlet and the device's supplemental fuel control element. The nitrous oxide that is delivered to the engine's air inlet is conveyed via a delivery hose to an injection nozzle. The amount of nitrous oxide, which provides the oxygen required for the horsepower increase, is adjustable by means of a removable metering jet installed in the injection nozzle itself.

The nitrous oxide that is distributed to the fuel control circuit passes through a small bleed orifice. This bleed orifice provides a reference source of bottle pressure and a controllable source of pressure to perform the needed function of fuel enrichment. Fuel enrichment occurs by conveying this source of pressure through a delivery hose to a vacuum ported fuel pressure regulator. This source of pressure on the rubber diaphragm of the fuel pressure regulator causes an increase in fuel pressure. This increase in fuel pressure performs the function of adding fuel volume through the engine's own fuel injectors. The amount of additional fuel that is added is variable by way of an adjustable metering jet in the fuel control circuit (e.g., by substituting a metering jet with differing characteristics, such as jet diameter). This jet accomplishes the task by controlling the amount of pressure allowed to build in the delivery hose to the fuel pressure regulator. The jet bleeds off excess pressure in the fuel control circuit and vents it through a delivery tube, back to the intake manifold plenum.

One currently preferable embodiment of the present invention provides a system for feeding oxygen enhancer to an internal combustion engine of a vehicle, wherein the vehicle comprises a body, the internal combustion engine having at least one combustion chamber and a fuel regulator for controlling a fuel feed to the at least one combustion chamber, the fuel feed variable with a pressure in an internal pressure chamber having a pressure connection, and an accelerator comprising an accelerator connection, the system comprising: a source of pressurized oxygen enhancer; an oxygen enhancer delivery device connected to the source of pressurized oxygen enhancer; a flow interruption device for controlling feed of the oxygen enhancer, wherein the flow interruption device is positioned so as to allow interruption of feed of the oxygen enhancer to the at least one combustion chamber; an accelerator coupling between the accelerator connection and the flow interruption device; an oxygen enhancer manifold, wherein the oxygen enhancer manifold comprises a pressure chamber for containing pressurized oxygen enhancer, an orifice connecting the source of pressurized oxygen enhancer to the pressure chamber, such that a portion of the pressurized oxygen enhancer is feedable to the pressure chamber, and a fuel regulator conduit connecting the pressure chamber to the fuel regulator; wherein a signal from the accelerator connection through the accelerator coupling to the flow interruption device allows feed of the oxygen enhancer to the at least one combustion chamber and feed of the oxygen enhancer through the orifice to the pressure chamber, thereby increasing the pressure in the pressure chamber; and wherein the fuel regulator conduit is responsive to the pressure of the pressurized oxygen enhancer in the pressure chamber of the oxygen enhancer manifold, wherein the internal pressure chamber of the fuel regulator is responsive to the pressure in the pressure chamber by way of the fuel regulator conduit, such that the feed of fuel increases to the at least one combustion chamber with increased pressure in the pressure chamber of the oxygen enhancer manifold; and wherein the feed of pressurized oxygen enhancer results in a lower pressure of the pressurized oxygen enhancer within the source of pressurized oxygen enhancer and within the pressure chamber of the oxygen enhancer manifold.

A currently preferable embodiment of the present invention further provides a nitrous oxide device for a vehicle, wherein the vehicle comprises a body, an accelerator, and an engine, the engine having at least one combustion chamber, an air intake, and a pressure governed fuel regulator for controlling fuel feed to the at least one combustion chamber, the nitrous oxide device comprising: a container of pressurized nitrous oxide; a nitrous oxide conduit comprising a nozzle, wherein the nitrous oxide conduit is connected to the container of pressurized nitrous oxide, and wherein the nozzle is positionable such that nitrous oxide is feedable to the air intake; a solenoid connected to a valve for controlling the feed of the nitrous oxide to the at least one combustion chamber, wherein the valve is positioned so as to interrupt the feed of the nitrous oxide to the at least one combustion chamber, and wherein a signal from the accelerator to the solenoid causes feed of the nitrous oxide to the fuel injector throttle body; and a nitrous oxide manifold comprising a chamber, an orifice connecting the nitrous oxide conduit to the chamber, a pressure release jet, and a fuel regulator conduit connecting the chamber to the pressure governed fuel regulator, such that the orifice allows pressurization of the chamber by nitrous oxide and transfer of pressurized nitrous oxide to the pressure governed fuel regulator, such that the fuel feed is variable with varying pressure of the transferred pressurized nitrous oxide, and wherein the pressure release jet allows variable release of the pressurized nitrous oxide from the chamber.

Another currently preferable embodiment of the present invention further provides a method for installing a nitrous oxide device for a vehicle having an engine compartment, a battery having a positive terminal and a negative terminal, an engine in the engine compartment, the engine including an air intake and a fuel pressure regulator having a vacuum conduit connected at a vacuum connector, and an accelerator position output, comprising: emplacing a nitrous oxide bottle in a first location; emplacing a component unit in a second location, the component unit having attached a feed conduit, a fuel pressure conduit, a vent connector, and a wiring harness, the wiring harness having an accessory wire connector with a positive terminal attachment and a negative terminal attachment to chassis ground, and an accelerator position connector; connecting the feed conduit to the nitrous oxide; installing a nitrous injection nozzle in the air intake; connecting the feed conduit to the nitrous injection nozzle; disconnecting the vacuum conduit from the vacuum connector; connecting the vacuum conduit to the vent connector; connecting the fuel pressure conduit to the vacuum connector; connecting the positive accessory wire attachment to a positive accessory wire; connecting the negative terminal attachment to the chassis ground; and connecting accelerator position connector to the accelerator position output.

Additional objects, advantages and novel features of the invention will be set forth in part in the description and figures that follow, and in part will become more apparent to those skilled in the art upon examination of the following; these features may also be learned by practice of the invention.

DETAILED DESCRIPTION

The present invention relates to a nitrous oxide injection device and system, and a method of installation of the device and system, and, in particular, to a self-contained, easy to install nitrous oxide device that provides fuel delivery that varies with nitrous oxide tank pressure. The present invention accomplishes varied fuel delivery by way of a nitrous manifold that is pressurized by a bleed orifice from the nitrous oxide source; the pressure from the manifold is then transferred by a line (conduit) to the fuel pressure regulator of the vehicle, so that fuel delivery is increased in proportion to the pressure of the nitrous oxide source.

References will now be made in detail to an embodiment of the present invention, an example of which is illustrated in the accompanying drawings.

Figure 1:
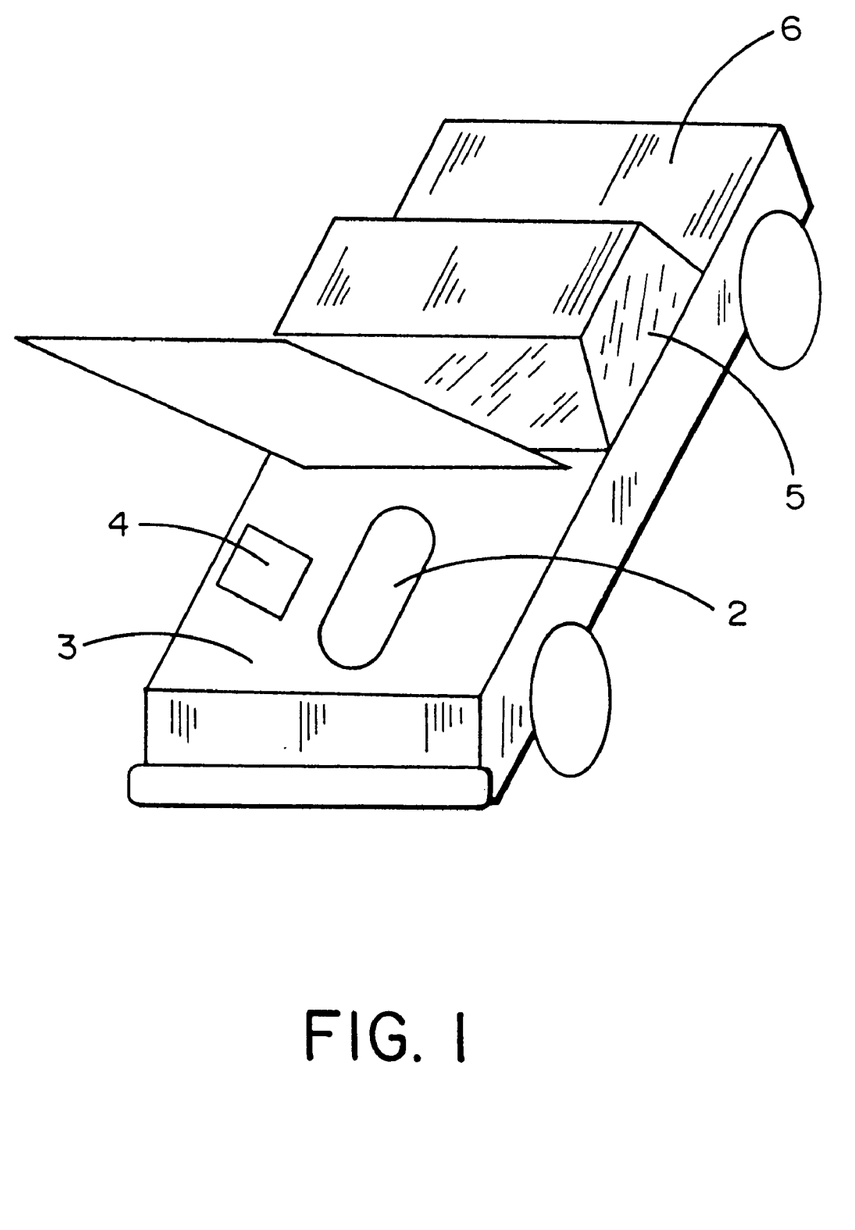
FIG. 1 is an overview of the location of installation of an embodiment of the present invention in a typical vehicle.

FIG. 1 presents an overview of the location of installation of an embodiment of the present invention in a typical vehicle. FIG. 1 presents a vehicle 1, such as an automobile having an engine 2, an engine compartment 3 with the device 4 of an embodiment of the present invention, which is primarily installed in the engine compartment 3, a passenger compartment 5, and a trunk compartment 6.

Figure 2:
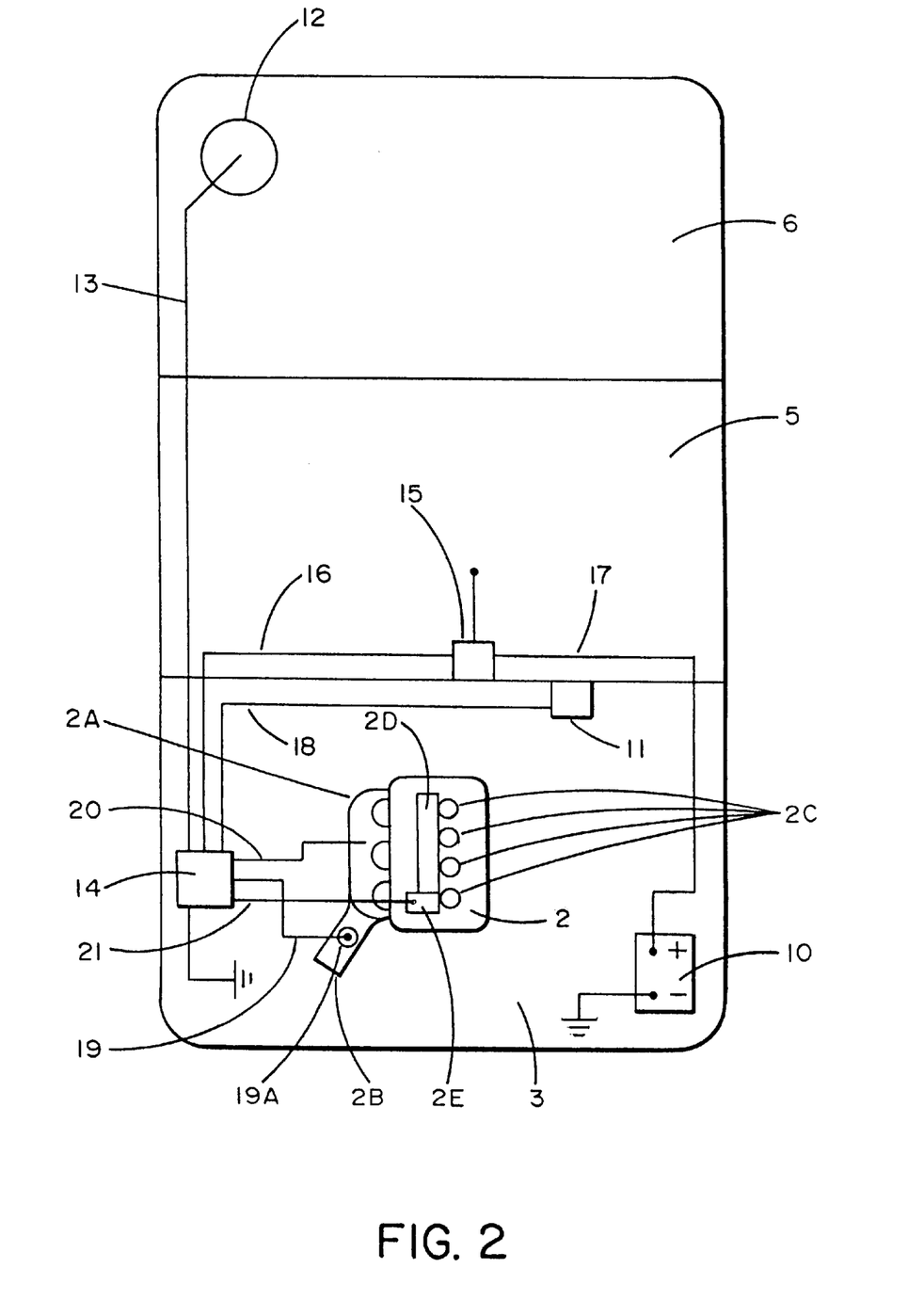
FIG. 2 contains an overhead view of an embodiment of the present invention as installed in a typical vehicle.

FIG. 2 contains an overhead view of an embodiment of the present invention as installed in a typical vehicle 1. As shown in FIG. 2, the vehicle 1 includes an engine 2 having combustion chambers (not shown), with an engine intake manifold 2a and an air intake 2b, such as an air intake for a fuel injection system, fuel injectors 2c on a fuel rail 2d, and a fuel regulator 2e that is pressure actuated, such as a fuel pressure regulator, connected to the fuel rail 2d; the engine 2 is located in an engine compartment 3. The vehicle 1 also includes a passenger compartment 5 and a trunk compartment 6. The engine compartment 3 further includes a battery 10 and an accelerator position indicator 11, such as a TPS.

Elements of an embodiment of the present invention are contained in each of these compartments. An embodiment of the present invention includes a source of an oxygen enhancer 12, such as a tank of compressed nitrous oxide or other readily usable source of oxygen that may be stored in a compressed form, contained in the trunk compartment 6. The source of an oxygen enhancer 12 is connected by a conduit 13, such as a hose or other line, to a components unit 14. In an embodiment of the present invention, the components unit 14 includes a solenoid switch, a throttle switch, such as an electronic throttle switch, and an oxygen enhancer manifold with a pressure release vent, such as a fuel pressure jet (not shown; see FIG. 3, below). A switch 15 is coupled 16, by for example electrical connecting wires, to the components unit 14. The battery 10 is also coupled 17, by for example electrical connecting wires, to the combination unit 14 to provide an electrical power source for the device. The combination unit 14 is further coupled 18, by for example, electrical connecting wires, to the accelerator position indicator 11.

In an embodiment of the present invention, all major components (the combination unit—solenoid, electronic throttle switch, nitrous manifold) are contained in an attractive enclosure. An embodiment of the present invention includes a pre-assembled wiring harness for easy "plug in" installation of the electrical connecting wires.

As further shown in FIG. 2, attached to the combination unit 14 is a feed conduit 19, such as a hose, with an end 19a, such as a nozzle having a nitrous oxide jet. The conduit end 19a is positioned so as to direct a feed of oxygen enhancer that is transmitted from the source of the oxygen enhancer 12 via pressure through the component unit 14 into an air intake 2b. The air intake 2b is, in turn, positioned so as to feed air and the transmitted oxygen enhancer into the combustion chambers (not shown) of the engine 2. Connected to the component unit 14 is a vent conduit 20, which connects the pressure release valve (not shown) and a vent to the engine intake manifold 2a.

As further shown in FIG. 2, connecting the fuel regulator 2e and the component unit 14 is a fuel regulator conduit 21. This conduit 21 transmits pressure to the fuel regulator 2e such that fuel flow to the fuel rail 2d and hence to the fuel injectors 2c is affected by the pressure. In an embodiment of the present invention, pressure to the fuel regulator 2e varies with changes in the pressure of the oxygen enhancer transmitted into the air intake 2b. (See the discussion below with regard to FIG. 3 for more information on the relationship of the oxygen enhancer transmission to the air intake 2b and to the fuel regulator 2e, as well as description regarding the component unit.)

Figure 3:
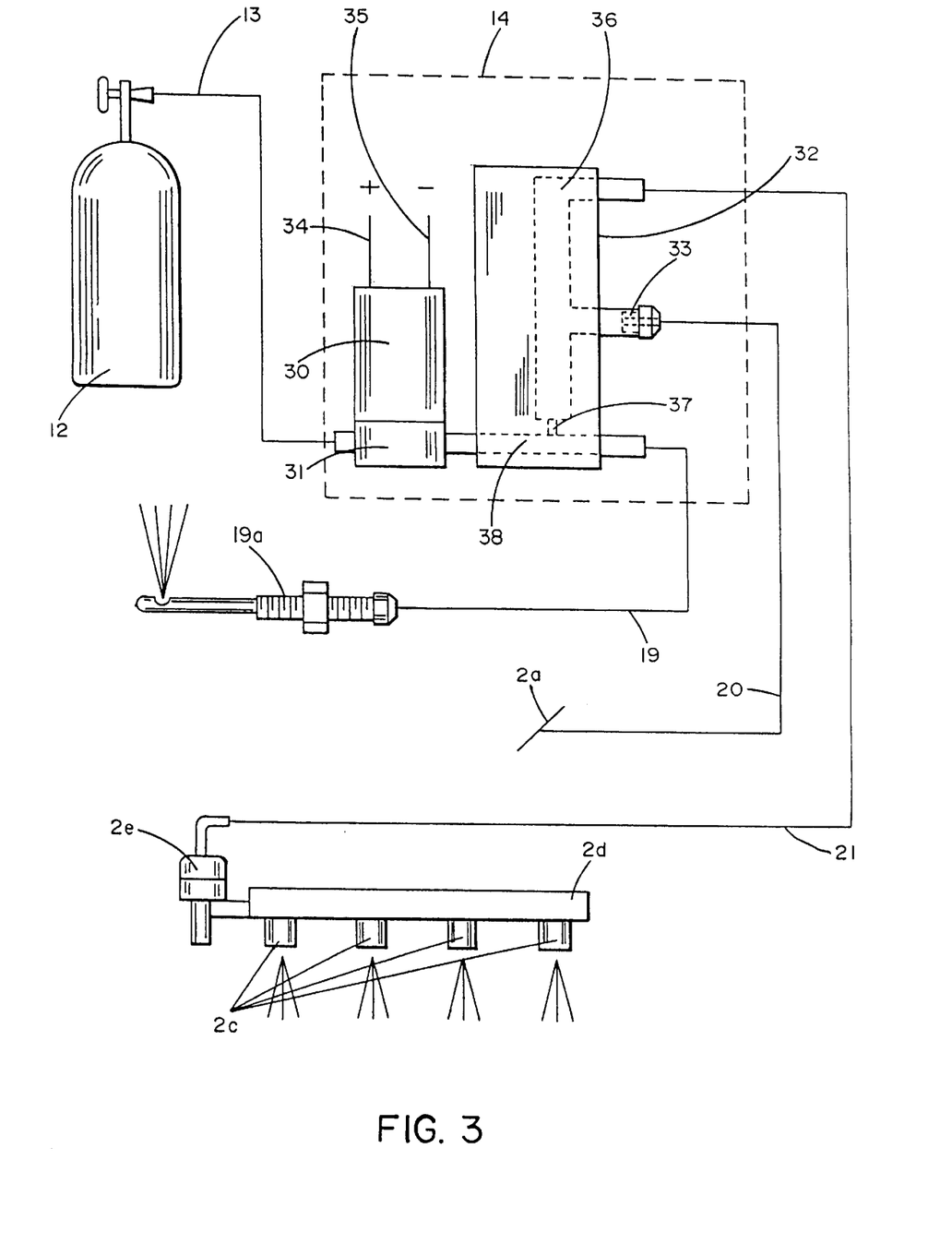
FIG. 3 presents the components of an embodiment of the present invention.

FIG. 3 presents the components of an embodiment of the present invention. As shown in FIG. 3, these components include the source of the oxygen enhancer 12, a conduit 13 from the oxygen enhancer 12 to the component unit 14, a feed conduit 19 with a conduit end 19a for feeding nitrous oxide into the air intake (not shown; see FIG. 2), a vent conduit 20 connected to the engine intake manifold 2a, and a fuel regulator conduit 21 connected to the fuel regulator 2e, in turn connected to a fuel rail 2d and fuel injectors 2c.

As shown in FIG. 3, the component unit 14 further includes a solenoid switch device 30 for controlling flow of the oxygen enhancer via a valve piece 31, an oxygen enhancer manifold 32, and a pressure release vent 33, such as a fuel pressure jet. The solenoid switch device 30 is connected 34, 35 to the terminals of a voltage source, such as the vehicle battery (not shown; see FIG. 2). The oxygen enhancer manifold 32 includes an internal chamber 36, which is connected by a bleed orifice 37 to a conduit chamber 38 that is also within the oxygen enhancer manifold 32. The conduit chamber 38 primarily functions to communicate oxygen enhancer from the valve piece 31 to the feed conduit 19 when the valve piece 31 is in an open position.

The bleed orifice 37 also provides an oxygen enhancer pressure bleed to the internal chamber 36. Pressure from this chamber 36 in turn, via the conduit 21, provides pressure to the fuel regulator 2e. In an embodiment of the present invention, pressure regulation in the internal chamber 36 is provided via a pressure release vent 33, such as a fuel pressure jet. An embodiment of the present invention includes three power stages in each kit, which are regulated by varying the pressure release vent 33 and the feed conduit end 19*a*, resulting in incremental power increases due to larger size jets. In an embodiment of the present invention, the variation in the pressure release vent 33 is accomplished by using fuel pressure jets with varying characteristics, such as jet diameter; and the variation in the feed conduit end 19*a* is accomplished by using nitrous oxide jets with varying characteristics, such as jet diameter.

Figure 3A:
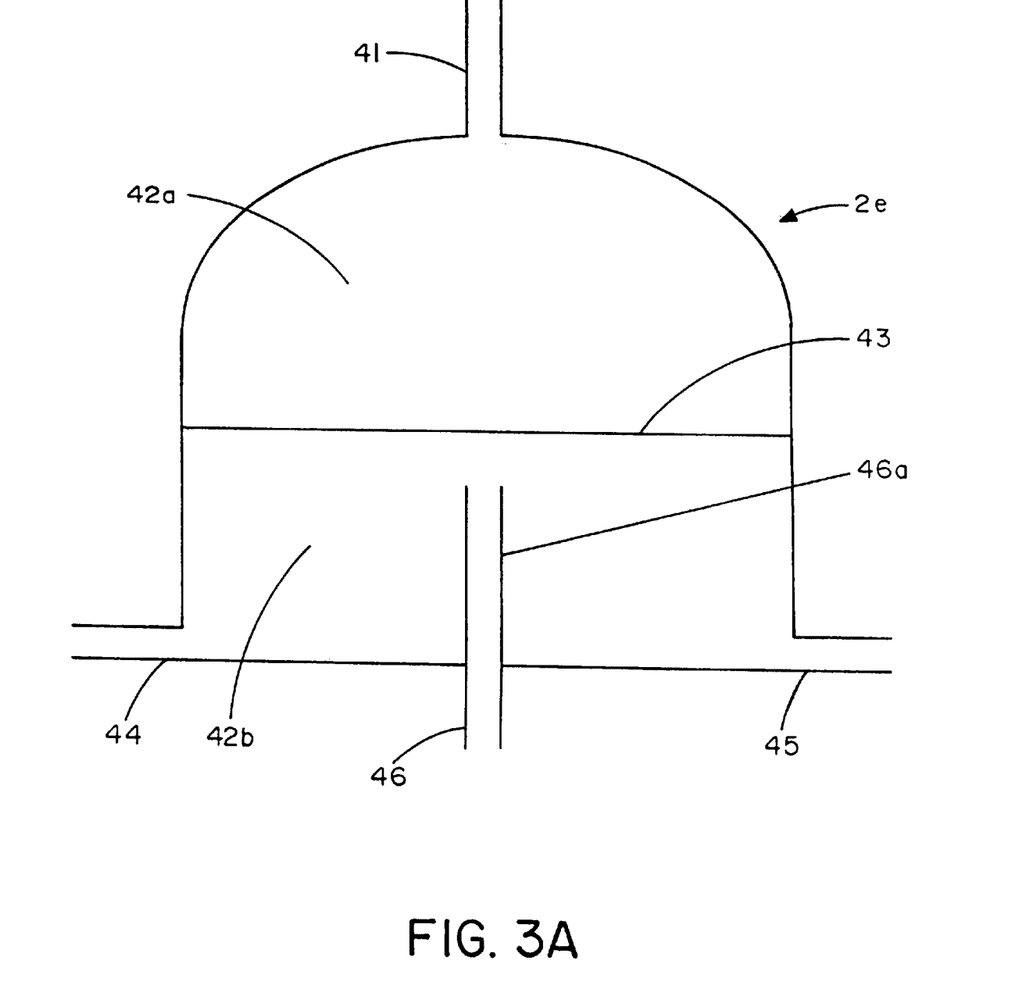
FIG. 3A presents a cross section of a typical fuel pressure regulator for use with an embodiment of the present invention.

FIG. 3A presents a representative cross section of a typical fuel pressure regulator 2*e* for use with an embodiment of the present invention. As shown in FIG. 3A, in a typical vehicle, pressure applied through a first opening 41 to the to the fuel pressure regulator 2*e* regulates fuel pressure as follows. The fuel pressure regulator 2*e* comprises a chamber separated into an upper portion of the chamber 42*a* and a lower portion of the chamber 42*b* by a pressure actuated diaphragm 43. Fuel is fed through the lower portion of the chamber 42*b* from a second opening 44 to a third opening 45. An impinging pipe 46, having an upper end 46*a*, provides a connection to the lower portion of the chamber 42*b* for return of excess fuel, such as to the fuel tank (not shown). The diaphragm 43 regulates fuel feed by varying the pressure of the fuel flowing from the second opening 44 to the third opening 45. The fuel pressure is varied by varying the pressure applied via the first opening 41 to the upper portion of the chamber 42*a*. Increased pressure in the upper portion of the chamber 42*a* causes the diaphragm 43 to move downward, as shown in FIG. 3A, closing the gap between the diaphragm 43 and the upper end of the impinging pipe 46*a*. As this gap closes, the return flow of fuel through the impinging pipe 46 becomes more restricted, causing an increase in pressure of flow from the third opening 45 of the fuel pressure regulator.

In a vehicle without the device of an embodiment of the present invention installed, the pressure regulator operates as follows. A vacuum line is attached to the first opening 41. Under non-acceleration, vacuum pressure in the upper portion of the chamber 42*a* moves the diaphragm 43 upward, as shown in FIG. 3A, away from the upper end 46*a* of the impinging pipe 46, reducing the pressure of fuel in the lower portion of the chamber 42*b*, and thereby reducing the pressure of the exiting fuel at the third opening 45. Under acceleration, the vacuum pressure in the upper portion of the chamber 42*a* is reduced (increased pressure), causing the diaphragm 43 to move downward, as shown in FIG. 3A, toward the upper end 46*a* of the impinging pipe 46, increasing the pressure of the fuel in the lower portion of the chamber 42*b*, and thereby increasing the pressure of the exiting fuel at the third opening 45. Typically, fuel pump pressure is on the order of 90 pounds per square inch (psi), and exiting fuel pressure from the fuel pressure regulator 2*e* at the third opening 45 is at a maximum pressure of approximately 40 psi.

In an embodiment of the present invention, the pressure in the upper portion of the chamber 42*a*, as shown in FIG. 3A, is regulated by the pressure in the internal chamber 36 of the oxygen enhancer manifold 32. This pressure in turn varies depending on two other factors: 1) an increase in pressure in the internal chamber 36 occurs from oxygen enhancer pressure bleeding through the bleed orifice 37 when the valve in the valve piece 31 is open, such that oxygen enhancer is flowing to the conduit end 19*a*; and 2) the pressure release vent 33 reduces pressure in the internal chamber 36 by releasing pressure to the engine intake manifold 2*a*; this pressure may also be further reduced by manifold vacuum. In an embodiment of the present invention, the pressure in the internal chamber 36, as shown in FIG. 3, causes an increase in pressure in the upper chamber 42*a* of the fuel pressure regulator 2*e*, as shown in FIG. 3A, such that the fuel pressure at the third opening 45 reaches a maximum pressure of approximately 60–65 psi. Other fuel pressures may also be achieved by varying the characteristics of the pressure release vent 33. Vacuum pressure and pressure under normal acceleration (i.e., when the device of the present invention is not operating) within the internal chamber 36, and hence within the upper chamber 42*a* of the fuel pressure regulator 2*e*, are also maintained via the pressure release vent 33 and connection by the vent conduit 20 to the engine intake manifold 2*a*.

Thus, the nitrous oxide injection device of an embodiment of the present invention automatically adjusts the amount of additional fuel being added in relation to nitrous bottle pressure so that consistent nitrous to fuel ratios are maintained. This results in greater power at all bottle pressures that the known art that uses a single pressure for controlling fuel feed. In a typical container of nitrous oxide that serves as an oxygen enhancer, the operating range for the present invention varies from approximately 1200 psi to 600 psi, as the nitrous oxide is fed to the engine. The fuel feed varies proportionately throughout this range, so that a correct balance of fed nitrous oxide and fuel is maintained.

In contrast, the known art, which uses a constant pressure feed to the fuel pressure regulator, must be calibrated for a single nitrous oxide pressure—such as 1200 psi—rather than varying throughout the range. As a result, the known art is less efficient in fuel/nitrous oxide feed at all other points in the range than the calibration point.

Figure 4:
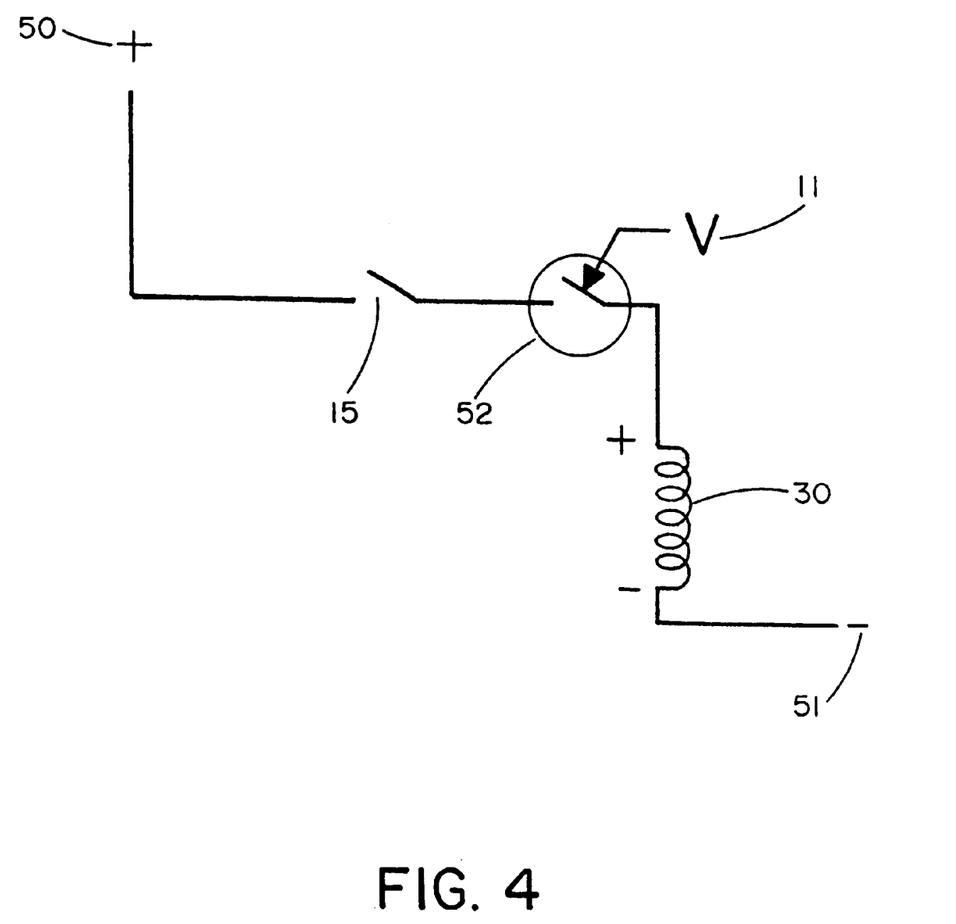
FIG. 4 shows a wiring diagram for the electrical components of the device of an embodiment of the present invention.

FIG. 4 shows a wiring diagram for the electrical components of the device of an embodiment of the present invention. As shown in FIG. 4, the electrical portion of the system includes a positive battery terminal connection 50 and a negative battery terminal connection 51. The circuit includes an enabling switch 15, also known as an arming switch, connected to the positive battery terminal connection 50. The enabling switch 15 is also connected to a trigger switch 52, such as an electronic throttle switch. The enabling switch 15 prevents operation of the system unless it is in the closed position. The trigger switch 52 is connected to the accelerator feed 11, such that the trigger switch 52 closes upon the accelerator feed 11 reaching the triggering point, such as a triggering voltage, as when the accelerator is in the full throttle position. The closing of the trigger switch 52 at the triggering voltage may be accomplished in a number of ways, such as through the user of a transistor. The trigger switch 52 thus prevents operation of the system except when the accelerator is in the full throttle position. The trigger switch 52 is also connected to the solenoid 30. The solenoid 30 is connected to the negative battery terminal connection 51. When the enabling switch 15 is closed and the trigger switch 52 is triggered, the circuit is complete and the solenoid 30 operates. The solenoid 30 in turn opens the valve (not shown; see FIG. 3), producing feed of the oxygen enhancer to the engine and to the oxygen enhancer manifold (not shown; see FIG. 3).

Figure 5:
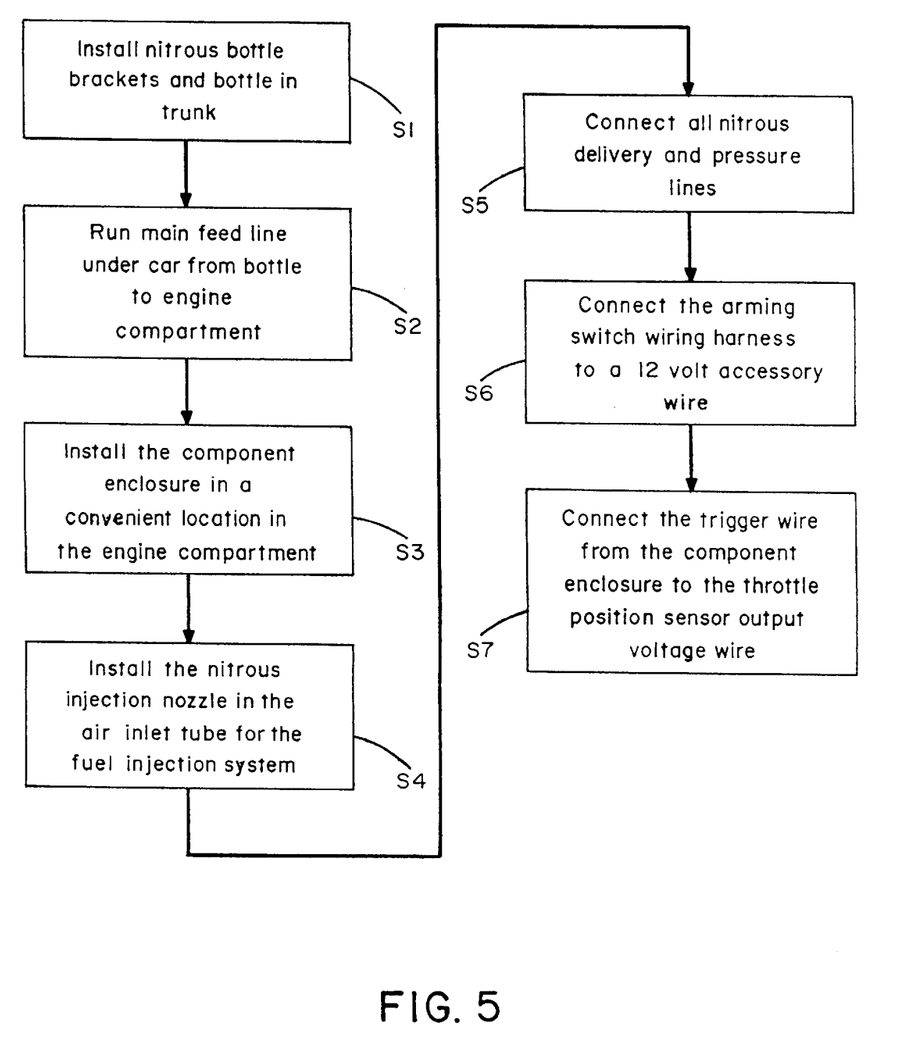
FIG. 5 presents the steps for a method of installation of an embodiment of the present invention.

FIG. 5 presents the steps for a method of installation of an embodiment of the present invention. This method of installation is simpler and more convenient than that of the known art because of the use of self-contained elements, a wiring harness, and advantages over the known art inherent in the design of the present invention, such as use of the existing TPS signal for triggering. In an embodiment of the present invention, installation of the device includes the following steps. In step S1, the user installs the nitrous bottle brackets and the bottle in the rear area of the car, such as in the trunk compartment. In step S2, the user runs the main feed line under the car from the bottle to the engine compartment. In step S3, the user installs the component enclosure in a convenient location in the engine compartment.

In step S4, the user installs the nitrous injection nozzle in the air inlet tube for the fuel injection system. In step S5, the user connects all nitrous delivery and pressure lines. In step S6, the user connects the arming switch wiring harness to a 12 volt accessory wire. In step S7, the user connects the trigger wire from the component enclosure to the throttle position sensor output voltage wire. Installation is now complete.

Thus, the nitrous oxide injection device of an embodiment of the present invention includes a supply cylinder containing pressurized liquid nitrous oxide. This cylinder is connected by means of a delivery hose to a normally closed, solenoid actuated valve. This solenoid actuated valve, which the operator uses to engage and disengage the system, is attached to a nitrous manifold assembly. The manifold assembly distributes the nitrous oxide to the engine's air inlet and the device's supplemental fuel control element. The nitrous oxide that is delivered to the engine's air inlet is conveyed via a delivery hose to an injection nozzle. The amount of nitrous oxide, which provides the oxygen required for the horsepower increase, is adjustable by means of a metering jet installed in the injection nozzle itself.

The nitrous oxide that is distributed to the fuel control circuit passes through a small bleed orifice. This bleed orifice provides a reference source of bottle pressure and a controllable source of pressure to perform the needed function of fuel enrichment. Fuel enrichment occurs by conveying this source of pressure through a delivery hose to a vacuum ported fuel pressure regulator. This source of pressure on the rubber diaphragm of the fuel pressure regulator causes an increase in fuel pressure. This increase in fuel pressure performs the function of adding fuel volume through the engine's own fuel injectors. The amount of additional fuel that is added is variable by way of an adjustable metering jet in the fuel control circuit (e.g., by substituting a metering jet with differing characteristics, such as jet diameter). This jet accomplishes the task by controlling the amount of pressure allowed to build in the delivery hose to the fuel pressure regulator. The jet bleeds off excess pressure in the fuel control circuit and vents it through a delivery tube, back to the intake manifold plenum.

In an embodiment of the present invention, solenoid current draw is many times less in the present invention to that of the known art. For example, in the known art, solenoid current draw typically is as high as 8–9 amps; in an embodiment of the present invention, solenoid current draw is about 2 amps. This reduced current draw is accomplished by use of a specially designed, low current draw solenoid. This design reduces the chances of such problems as burnt wires and blown fuses occurring from excessive solenoid current draw. Once armed, the nitrous system is engaged at wide open throttle by an electronic switch that senses off of the engine's throttle position sensor (TPS). All that is needed for installation is a wire tap, clipped onto the TPS output wire.

In contrast to the known art, the fuel control circuit according to an embodiment of the present invention uses a constant flow orifice instead of a set pressure regulator. The device of an embodiment of present invention thus varies pressure to the fuel pressure regulator diaphragm depending on nitrous bottle pressure. It is this increase in pressure on the fuel regulator's diaphragm that provides the additional fuel rail pressure needed for fuel enrichment.

In the nitrous system of an embodiment of the present invention, the fuel control circuit uses the actual bottle pressure as the reference pressure for assuring feed of the proper amount of enrichment fuel to the engine. Thus, the present invention includes fuel enrichment that is self adjusting within its operating range. This difference in approach with the known art allows the present invention to provide optimum nitrous oxide to fuel ratios at all bottle pressures, resulting in more horsepower per nitrous oxide expended.

The system engagement according to the present invention also provide advantages over the known art with regard to actuation of the nitrous oxide feed. The nitrous oxide injection system of the present invention utilizes a wire that is clipped on the throttle position sensor (TPS) output voltage wire. In this embodiment, the invention takes the voltage signal from the TPS and sends it to an electronic switch that engages and disengages the system when a predetermined voltage is reached at around wide open throttle. The engagement system of this embodiment greatly simplifies installation for the customer.

In contrast to the systems of the known art currently on the market, which require a large amount of assembly and installation, an embodiment of the present invention is designed as a kit that is preassembled inside of an attractive enclosure and is easily installed by the average car enthusiast.

Embodiments of the present invention have now been described in fulfillment of the above objects. It will be appreciated that these examples are merely illustrative of the invention. Many variations and modifications will be apparent to those skilled in the art.

What is claimed is:

1. A nitrous oxide device for an engine, wherein the engine includes an accelerator capable of providing a signal at least one combustion chamber, and a pressure governed fuel regulator for controlling fuel feed to the at least one combustion chamber, the nitrous oxide device comprising:

a container of pressurized nitrous oxide;

a nitrous oxide conduit connected to the container of pressurized nitrous oxide, such that a feed of the nitrous oxide is providable from the container to the at least one combustion chamber via the nitrous oxide conduit;

a valve for controlling the feed of the nitrous oxide to the at least one combustion chamber, wherein the valve is positioned so as to interrupt the feed of the nitrous oxide to the at least one combustion chamber, and wherein the signal from the accelerator causes feed of the nitrous oxide to the air intake; and a nitrous oxide manifold connected to the fuel pressure regulator, the nitrous oxide manifold for varying the fuel feed with varying pressure of the transferred pressurized nitrous oxide.

2. A system for feeding oxygen enhancer to an engine, the engine having at least one combustion chamber and a fuel regulator for varying a fuel feed to the at least one combustion chamber, the fuel feed varying with a pressure applied to the fuel regulator, the system comprising:

a pressurized source of oxygen enhancer for providing a feed of oxygen enhancer, the pressurized source having a varying pressure;

an oxygen enhancer conduit for transmitting the feed of oxygen enhancer to the at least one combustion chamber; and an oxygen enhancer pressure control device connected to the fuel regulator, the oxygen enhancer pressure control device varying the fuel feed via the fuel regulator, wherein the fuel feed is varied with the varying pressure of the source of the oxygen enhancer.

3. The system of claim 2, wherein the oxygen enhancer comprises nitrous oxide.

4. The system of claim 2, wherein the oxygen enhancer pressure control device comprises a pressure chamber.

5. The system of claim 2, wherein the engine comprises an internal combustion engine for a vehicle.

6. A method for delivering oxygen enhancer to an engine, the engine having at least one combustion chamber and a fuel regulator for varying a fuel feed to the at least one combustion chamber, the fuel feed variable with a pressure applied to the fuel regulator, the method comprising:

providing a variable feed of oxygen enhancer from a pressurized source of oxygen enhancer via a conduit to the at least one combustion chamber, wherein the pressurized source of oxygen enhancer has a varying pressure;

applying a fuel feed control pressure to the fuel regulator, such that the fuel feed varies with the varying pressure of the pressurized source of the oxygen enhancer.

7. A method for installing a oxygen enhancer device for a vehicle having an engine, the engine including an air intake and a fuel pressure regulator, and an accelerator position output, wherein the oxygen enhancer device includes an oxygen enhancer source, a component unit having a feed conduit, an oxygen enhancer source conduit, a pressure control conduit, and an accelerator position output connector, the method comprising:

emplacing the nitrous oxide source in a first location in the vehicle;

emplacing the component unit in a second location in the vehicle;

connecting the feed conduit to the air intake;

connecting the oxygen enhancer source conduit to the oxygen enhancer source;

connecting the pressure control conduit to the fuel pressure regulator; and connecting accelerator position output connector to the accelerator position output.

8. A pressure control manifold for providing a variable bleed gas pressure for a pressure controlled fuel regulator for controlling fuel feed to an internal combustion engine, the internal combustion engine having a source of gas having a gas pressure, the gas pressure being variable, comprising:

a pressure chamber having an outlet;

a bleed orifice in the pressure chamber for bleeding the source of pressurized gas into the pressure chamber; and a conduit for communicating the pressure chamber with the pressure controlled fuel regulator;

wherein the pressure of the gas produces a bleed pressure in the pressure chamber via the bleed orifice, the bleed pressure varying with the varying pressure of the gas, and wherein the bleed pressure is transmittable from the chamber via the conduit to the pressure controlled fuel regulator, such that the fuel feed varies with the varying bleed pressure.

* * * * *